United States Patent [19]

Yagi et al.

[11] Patent Number: 5,169,421
[45] Date of Patent: Dec. 8, 1992

[54] METHOD OF MANUFACTURING SILICA GLASS OPTICAL WAVEGUIDE PREFORM

[75] Inventors: Takeshi Yagi; Hiroshi Hihara; Tsuguo Satoh; Takayuki Morikawa; Kazuaki Yoshida, all of Tokyo, Japan

[73] Assignee: The Furukawa Electric Co., Ltd., Tokyo, Japan

[21] Appl. No.: 757,902

[22] Filed: Sep. 11, 1991

[30] Foreign Application Priority Data

Sep. 15, 1990 [JP] Japan .................. 2-244815
Jan. 18, 1991 [JP] Japan .................. 3-18421
Mar. 8, 1991 [JP] Japan .................. 3-68698
Apr. 26, 1991 [JP] Japan .................. 3-125584

[51] Int. Cl.$^5$ ............... C03C 25/02; C03B 37/023
[52] U.S. Cl. ................... 65/3.11; 65/3.1; 65/3.2; 264/174
[58] Field of Search ............. 65/3.11, 3.13, 3.2, 65/900, 183, 34; 425/114, 113; 264/1.5, 174

[56] References Cited

U.S. PATENT DOCUMENTS

| | | | |
|---|---|---|---|
| Re. 31,868 | 4/1985 | Beasley et al. | 385/145 |
| 4,161,500 | 7/1979 | Schleinitz et al. | 264/174 |
| 4,253,731 | 3/1981 | Anderson et al. | 385/142 |
| 4,381,141 | 4/1983 | Sakuragi et al. | 65/3.3 |
| 4,678,274 | 7/1987 | Fuller | 385/144 |
| 4,685,946 | 8/1987 | Derks et al. | 65/17 |
| 4,729,777 | 3/1988 | Mimura et al. | 65/13 |
| 4,801,186 | 1/1989 | Wagatsuma et al. | 385/141 |
| 4,865,418 | 9/1989 | Takahashi et al. | 385/144 |
| 5,076,653 | 12/1991 | Kayashima et al. | 385/109 |

FOREIGN PATENT DOCUMENTS

| | | |
|---|---|---|
| 0197586 | 3/1986 | European Pat. Off. . |
| 3633307A1 | 3/1988 | Fed. Rep. of Germany . |
| 59-217651 | 12/1984 | Japan . |
| 60-210539 | 10/1985 | Japan . |
| 61-41105 | 2/1986 | Japan . |
| 61-266325 | 11/1986 | Japan . |
| 62-05204 | 1/1987 | Japan . |
| 62-102203 | 5/1987 | Japan . |
| 63-11902 | 7/1988 | Japan . |
| 63-166738 | 7/1988 | Japan . |
| 64-56331 | 3/1989 | Japan . |
| 1-294548 | 11/1989 | Japan . |
| 2-10303 | 1/1990 | Japan . |
| 2-10304 | 1/1990 | Japan . |

OTHER PUBLICATIONS

Glass Fibres From Mechanically Shaped Preforms, Dorn et al, Glastech, Ber. 60 (1987) No. 3. pp. 79'82.
"Mechanical Shaping of Preforms for Low Loss at Low Cost", R. Dorn et al, Journal of Optical Communications, No. 1, Mar. 1989, pp. 2–5.
"Mechanically Shaped Preforms for Optical Fiber Production", R. Dorn, Electrical Communication, 59 (1985), No. 4, ppo. 396–400.

Primary Examiner—Robert L. Lindsay
Attorney, Agent, or Firm—Frishauf, Holtz, Goodman & Woodward

[57] ABSTRACT

An extruding apparatus having at least two independent inlet ports, one outlet port communicating with the inlet ports, and at least two passages connecting the inlet ports with the outlet port, in which a section of a joint portion of the passages has a central portion and an outer peripheral portion which are concentrically arranged, is prepared. A core material is supplied to one of the passages communicating with the central portion of the joint portion from a corresponding inlet port, and a cladding material is supplied to the other passage communicating with the outer peripheral portion from a corresponding inlet port, thereby causing the two materials to join each other at the joint portion. An integral shaped body having a portion corresponding to a core at its central portion and a portion corresponding to a cladding around the central portion is extruded from the outlet port. Water and a binder and other impurities are removed from the shaped body, and the resultant body is consolidated.

10 Claims, 4 Drawing Sheets

METHOD OF MANUFACTURING SILICA GLASS OPTICAL WAVEGUIDE PREFORM

Background of the Invention

1. Field of the Invention

The present invention relates to a method of manufacturing a perform for forming an optical waveguide such as an optical fiber, an image fiber, or a light guide, for use in the field of optical communication or optics.

2. Description of the Related Art

In the field of communication or optics, in order to form an optical fiber perform, an image fiber perform, or a light guide perform, a CVD (Chemical Vapor Deposition) method such as a VAD (Vapor-phase Axial Deposition) method, an MCVD (Modified Chemical Vapor Deposition) method, an OVD (Outside Vapor Deposition) method, or a PCVD (Plasma Chemical Vapor Deposition) method, a slip casting method, or a method of combining the CVD method and a sol-gel method has been adopted.

In the CVD method, a halide gas such as $SiCl_4$ or $GeCl_4$ is used as a starting material. The material is oxidized or flame-hydrolyzed to form an oxide powder of $SiO_2$ or $GeO_2$, and the formed powder is grown by deposition on a predetermined deposition surface (e.g., the distal end face of a target, the inner circumferential surface of a silica tube, or the surface of a mandrel). The deposited powder is consolidated to form a perform.

Recently, means for manufacturing a perform according to an all-synthesis VAD method is also adopted to obtain an optical fiber having higher quality.

In the manufacture of a perform for a single-mode optical fiber, for example, porous glass bodies for a core and a cladding are simultaneously synthesized at a suitable outer diameter ratio by the VAD method and then consolidated. Thereafter, in order to obtain a desired core/cladding outer diameter ratio, a porous glass body for a cladding is deposited on the surface of the resultant transparent glass body by the OVD method and then consolidated.

In the slip casting method, as disclosed in, e.g., Published Unexamined Japanese Patent Application No. 64-56331, a silica glass powder is dispersed in water to form a slurry, and the slurry is poured into mold so that water contained in the slurry is removed through pores of the mold. As a result, a porous glass body consisting of the glass powder is formed. Thereafter, drying, purifying and consolidating the porous glass body are performed.

In the method combining the CVD method and a solgel method, as disclosed in, e.g., Published Unexamined Japanese Patent Application No. 1-294548, a rod-like porous glass body (core glass + part of cladding glass) manufactured mainly by the CVD method and a tubular porous glass body (the remaining portion of cladding glass) manufactured by the sol-gel method are combined by a rod-in-tube technique. Thereafter, these porous glass bodies are simultaneously consolidated.

The CVD method, the slip casting method, and the method combining the CVD method and the sol-gel method described above still have the following technical problems.

In the CVD method, although a degree of technical completeness for obtaining a good product is high, a deposition efficiency of an oxide powder is as low as 30% to 50%, and the size of installations increases due to disposal of waste gas, thereby posing problems in yield, manufacturing cost, and installation economy.

The slip casting method can manufacture a high-quality porous glass body at a high efficiency with simple installations. However, a waveguide structure cannot be manufactured by this technique alone.

The slip casting method, therefore, must be improved in this respect or used in combination with another means, but no prior art relating to the slip casting method suggest such techniques.

The method combining the CVD method and the sol-gel method has problems in that, e.g., the cost of an alkoxide as a material is high, and a gel product easily cracks during drying to make it difficult to increase the size of a perform.

As a method of manufacturing a waveguide perform, in addition to the above methods, a method of manufacturing a glass perform according to a MSP (Mechanically Shaped Perform) method is also adopted as disclosed in, e.g., Published Unexamined Japanese Patent Application Nos. 60-210539 and 61-266325, and Glastech. Ber 60 (1987).

In this method, a coaxial screw conveyor is used to fill and compress silica fine powder for a core, a cladding into a silica glass tube. Thereafter, the porous perform is taken out from the silica glass tube is consolidated.

In this MSP method, the core and cladding portions are simultaneously formed in the silica glass tube. In this method a shaped body tends to be inhomogeneity. This leads to generation of air bubbles in perform. And, air bubbles formed during consolidation lead to a scattering loss of a final product, e.g., an optical fiber.

In addition, in this MSP method, the size of a perform is inconveniently determined by the silica glass tube serving as molds.

SUMMARY OF THE INVENTION

The present invention has been made in consideration of the above situation and has as its object to provide a novel method of manufacturing a silica glass optical waveguide perform.

It is another object of the present invention to provide a method capable of rationally and economically manufacturing a high-quality silica glass optical waveguide perform.

The present invention provides a method of manufacturing a silica glass optical waveguide perform, comprising the steps of:

preparing an extruding apparatus which has at least two independent inlet ports, one outlet port communicating with the inlet ports, and at least two passages connecting the inlet ports with the outlet port, and in which a section of a joint portion of the passages has a central portion and an outer peripheral portion which are concentrically arranged;

supplying a core material to one of the passages communicating with the central portion of the joint portion from a corresponding inlet port, and supplying a cladding material to the other passage communicating with the outer peripheral portion from a corresponding inlet port, thereby causing the two materials to join each other at the joint portion;

extruding an integral shaped body having a portion corresponding to a core at a central portion thereof and a portion corresponding to a cladding around the central portion from the outlet port;

removing impurities from the shaped body; and consolidating the resultant body.

According to the present invention, a portion corresponding to a core and a portion corresponding to a cladding can be integrated by extrusion without trapping substances which may form air bubbles between the two portions. Therefore, an optical waveguide perform having very high quality can be manufactured at low cost and high yield.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

In the present invention, at least two inlet ports are formed in an extruding apparatus. A core material is supplied from one of the inlet ports, and a cladding material is supplied from the other. The two materials are caused to join each other at a joint portion having a concentrical sectional pattern and are extruded from one outlet port, thereby forming an integral shaped body having a portion corresponding to a core in its central portion and a portion corresponding to a cladding around the core portion. The shaped body is dried. Then the shaped body is applied to a decreasing step and a purifying step. A binder contained in the shaped body is removed by the decreasing step. OH-radical and other metal elements contained in the shaped body as impurities are removed by the purifying step. Thereafter, the resultant body is consolidated to manufacture an optical waveguide perform.

A plastic material containing a silica glass powder can be used as the cladding material. A glass rod mainly consisting of silica glass or a plastic material containing a silica powder can be used as the core material. The plastic material containing a silica glass powder means a material obtained by adding water and, if necessary, a forming said (binder) to a pure silica glass powder or a silica glass powder to which is added a very small amount of dopant, and uniformly kneading the resultant material to impart plasticity to the material.

The silica glass powder to which is added a very small amount of dopant includes a powder mixture of the pure silica glass powder and a powder material of the dopant, a powder which is formed by adding the dopant in the state of a solution such as acetate, nitrate or alcoxide of the dopant to the pure silica glass powder, and a silica power containing the dopant which is synthesized by a CVD method.

When a glass rod mainly consisting of silica glass is used as the core material, a passage from the core inlet port to the joint portion of the extruding apparatus must be straight.

When a silica glass rod is used as the core material, the silica glass rod is preferably manufactured by a CVD method such as a VAD method.

One reason for this is that a glass rod serving as a core of a perform can be manufactured with high quality by a CVD method which is technically almost completely matured. The other reason is that the volume ratio of a glass rod in a perform is small. That is, even if a deposition efficiency of an oxide powder obtained by a CVD method is low, a reduction in yield can be reduced as a whole to avoid an increase in size of installations.

In addition, when a shaped body as the cladding material on the surface of a glass rod is to be dried, purified and consolidated, since the glass rod as the core has no air bubbles in it and air bubbles formed from the glass powder shaped body do not diffuse into the glass rod but externally disperse, air bubbles hardly remain.

Especially when a glass rod having a portion of cladding glass on its surface portion is used as the core material, no air bubbles remain in the interface between a core and a cladding. Even if air bubbles remain during consolidation of the cladding material, since the air bubbles remaining portion is formed outside the interface between the core and the cladding, a scattering loss as described above does not occur. Therefore, a glass rod having a portion of cladding glass on its surface is preferably used as the core material.

When a glass rod is used as the core material, the glass rod and a plastic material as the cladding material need only be supplied into the respective passages to form a glass powder shaped body on the surface of the glass rod. Therefore, a desired shaped body can be formed by economical installations and simple steps with high yield. In addition, the shaped body as the cladding material need only be dried, purified, and consolidated in a post-treatment.

Moreover, since the core portion of a perform is a glass rod (hard material) stable in physical properties, a glass powder shaped body (plastic material) formed on the glass rod is stably supported. Therefore, even a glass powder shaped body having a large outer diameter can be easily formed.

By manufacturing an optical waveguide perform as described above, therefore, the quality of the perform can be improved, and its yield can be increased to reduce its product cost to result in very economical manufacture.

When a plastic material containing a silica powder is used as the core material, the core and cladding plastic materials need only be supplied to an extruding apparatus to extrusion-die an integral shaped body. Therefore, since the shaped body can be obtained by economical installations and simple steps, high quality and high yield can be achieved.

The present invention will be described in more detail below.

Figure 1:
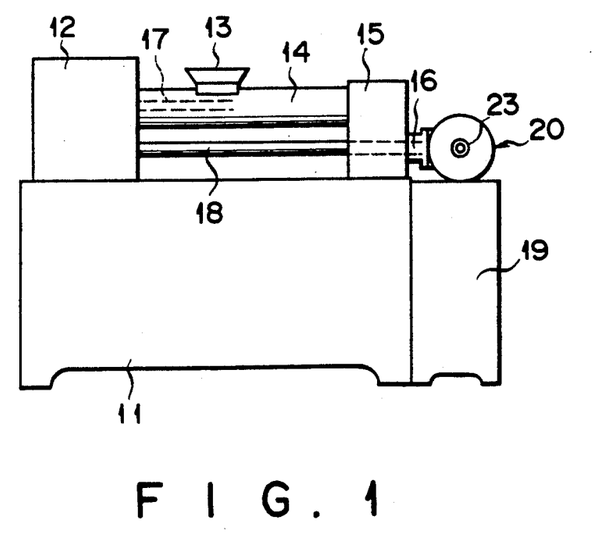
FIG. 1 is a side view showing an apparatus used to practice the first embodiment of the present invention.
Figure 2:
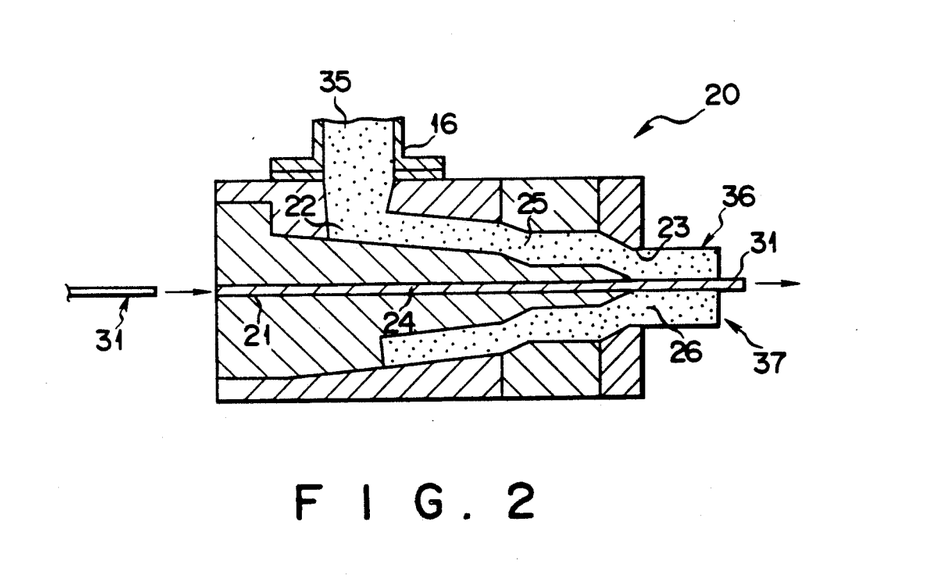
FIG. 2 is a sectional view showing a cross head of the apparatus shown in FIG. 1.

FIG. 1 is a side view showing an apparatus used to practice the first embodiment of the present invention, and FIG. 2 is a sectional view showing a cross head of the apparatus.

A motor 12 having transmitting means, a primary kneading chamber 14 having a hopper 13, a vacuum chamber 15, and a secondary kneading chamber 16 are sequentially coupled and arranged on a machine base 11. A screw (not shown) is incorporated in the primary kneading chamber 14 and rotated by the motor 12 and a transmission shaft 17, and another screw (not shown) is incorporated in the secondary kneading chamber 16 and rotated by the motor 12 and a transmission shaft 18. A cross head 20 is arranged on a machine base 19.

As shown in FIG. 2, the cross head 20 has two independent inlet ports 21 and 22, one common outlet port 23, two passages 24 and 25 extending from the inlet ports 21 and 22 to the outlet port 23, and a joint portion 26 which is formed between the inlet ports 21 and 22 and the outlet port 23 and at which the two passages 24 and 25 join each other. At the joint portion 26, the passages 24 and 25 join each other so as to have a concentrical sectional pattern.

In this arrangement, one passage 24 is formed straight with respect to the joint portion 26.

In the cross head 20 having the above arrangement, a glass rod supply machine (not shown) is arranged on the side of one inlet port 21, and the other inlet port 22 is coupled to the secondary kneading chamber 16.

A silica glass rod 31 as a core material is inserted from the inlet port 21. The silica glass rod 31 is formed by a CVD method such as a VAD method.

Figure 3:
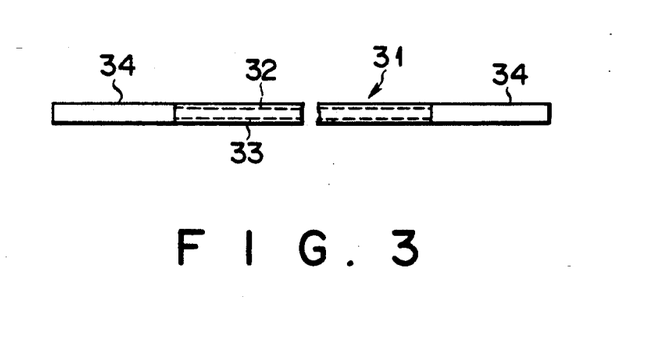
FIG. 3 is a view showing a connection state between a glass rod and an attached rod used in the first aspect.

The glass rod 31 may be formed by only core glass 32 or may have a portion of cladding glass 33 on its surface portion as is shown FIG. 3.

As shown in FIG. 3, an attached rod 34 having a proper length and used as a support or a dummy in extrusion die is welded to one or both ends of the glass rod 31.

Examples of the material of the attached rod 34 are, in addition to the same silica glass as the glass rod 31, ceramics and glass lower grade than silica.

A plastic material 35 as a cladding material mainly consists of a silica glass powder, and preferably, silica particles having a particle size of 100 μm or less.

In addition to the above main material, a fluorine-or boron-based dopant is added as a material for refractive index control to the main material of the plastic material 35 as needed.

The plastic material 35 is prepared by adding pure water and, if necessary, a forming said (binder) to a silica glass powder or a silica glass powder added a small amount of dopant, and uniformly kneading the resultant material to impart plasticity to the material.

Examples of the forming said are organic substances such as polyvinyl alcohol, polyvinylbutyral, polyethyleneglycol, methylcellulose, carboxymethylcellulose, ethylcellulose, hydroxypropylcellulose, and glycerine; and inorganic substance such as and colloidal silica.

The addition amount of the forming said in the plastic material 35 is about 1 to 20 wt% with respect to the powder glass material.

The plastic material 35 is supplied from the inlet port 22 Note that the inlet port of the plastic material 35 may be formed at a plurality of positions, e.g., another inlet port may be formed on the opposite side of the inlet port 22. With this arrangement, the plastic material as the cladding material can be uniformly supplied on the surface of the glass rod 31 more easily.

An operation of this embodiment of the present invention will be described below. The attached rod 34 connected to one end of the glass rod 31 is held by a glass rod supply machine (not shown) arranged on the side of the inlet port 21 of the cross head 20, and the distal end of the glass rod 31 is inserted in the inlet port 21 of the cross head 20. After the plastic material 35 is supplied from the hopper 13 into the primary kneading chamber 14, the glass rod supply machine and the motor 12 are driven to set the respective parts in an operative state.

As a result, the glass rod 31 is supplied from the inlet port 21 of the cross head 20 into the passage 24 by the glass rod supply machine, and the plastic material 35 in the primary kneading chamber 14 is supplied from the vacuum chamber 15 and the secondary kneading chamber 16 into the passage 25 through the inlet port 22 of the cross head 20 at a predetermined extrusion rate.

The glass rod 31 and the plastic material 35 join each other at the joint portion 26 of the cross head 20. As described above, the joint portion 26 has a concentrical sectional pattern, i.e., its central portion corresponds to the passage 24 and its outer peripheral portion corresponds to the passage 25. Therefore, the surface of the glass rod 31 is covered with the plastic material 35.

The glass rod 31 and the plastic material 35 are integrally extruded from the outlet port 23 of the cross head 20, thereby forming a shaped body 37 in which a porous glass body 36 consisting of the plastic material is formed on the surface of the glass rod 31.

Thereafter, the shaped body 37 is dried by a dryer to remove water from the porous glass body 36 and subjected to decreasing (binder removal) in a decreasing furnace.

Subsequently, purifying treatments and then a consolidating treatment are performed in accordance with conventional methods, thereby obtaining a perform.

Note that the glass rod 3 is preferably supplied while being supported at a portion near the inlet port 21 and at the joint portion. As a result, eccentricity of the core of the perform is suppressed to further improve its quality.

The second embodiment of the present invention will be described below.

Figure 4:
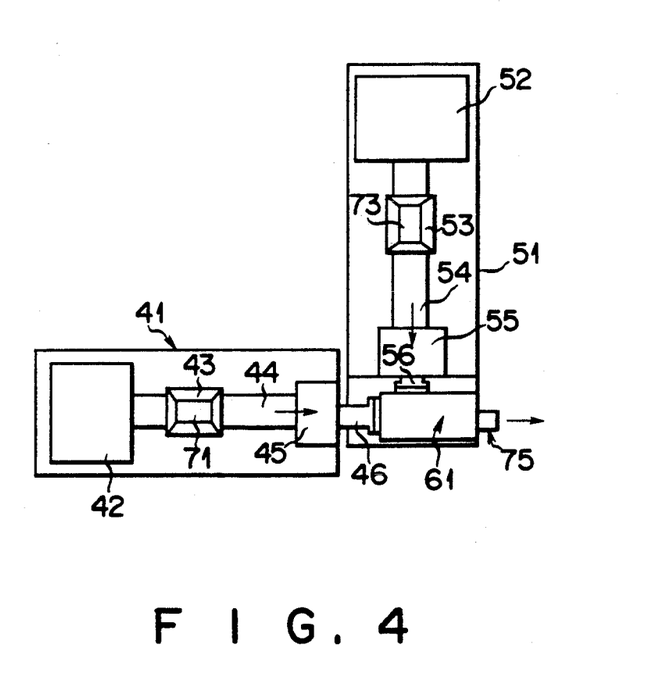
FIG. 4 is a plan view showing an apparatus used to practice the second embodiment of the present invention.
Figure 5:
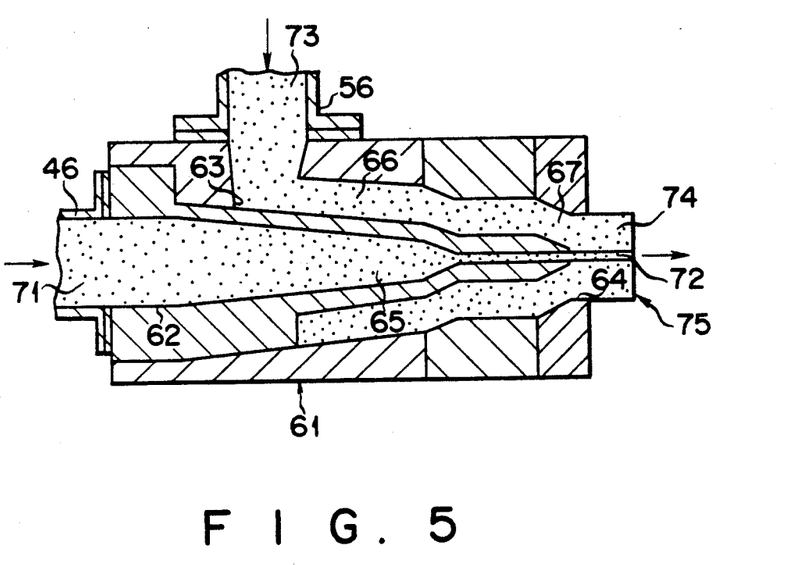
FIG. 5 is a sectional view showing a cross head of the apparatus shown in FIG. 4.

FIG. 4 is a sectional view showing an apparatus to practice the second aspect of the present invention, and FIG. 5 is a sectional view showing a cross head of the apparatus.

In an extrusion-forming apparatus shown in FIGS. 4 and 5, two extruders 41 and 51 are perpendicularly combined via a cross head 61.

Referring to FIG. 4, one extruder 41 has an arrangement in which a motor 42 having transmitting means, a primary kneading chamber 44 having a hopper 43, a vacuum chamber 45, and a secondary chamber 46 are sequentially coupled. A screw (not shown) is incorporated in the primary kneading chamber 44 and rotated by the motor 42 and a transmission shaft (not shown), and another screw (not shown) is incorporated in the secondary kneading chamber 46 and rotated by the motor 42 and a transmission shaft (not shown).

Referring to FIG. 4, the other extruder 51 also has an arrangement in which a motor 52 having transmitting means, a primary kneading chamber 54 having a hopper 53, a vacuum chamber 55, and a secondary kneading chamber 56 are sequentially coupled. A screw (not shown) is incorporated in the primary chamber 54 and rotated by the motor 52 and a transmission shaft (not shown), and another screw (not shown) is incorporated in the secondary kneading chamber 56 and rotated by the motor 52 and a transmission shaft (not shown).

The cross head 61 shown in FIG. 5 has two independent inlet ports 62 and 63, one common output portion 64, two passages 65 and 66 extending from the inlet ports 62 and 63 to the outlet port 64, and a joint portion 67 which is formed between the inlet ports 62 and 63 and the outlet port 64 and at which the two passages 65 and 66 join each other. At the joint portion 67, the passages 65 and 66 concentrically join each other.

In this arrangement, one passage 65 communicates with the central portion of the joint portion 67, and the other passage 66 communicates with its outer peripheral portion.

In the cross head 61 having the above arrangement, the secondary kneading chamber 46 of the extruder 41 is connected to one inlet port 62, and the secondary kneading chamber 56 of the extruder 51 is connected to the other inlet port 63.

A plastic material 71 as a core material is supplied from the inlet port 62, and a plastic material 73 as a cladding material is supplied from the inlet port 63. These plastic materials is mainly formed of a silica glass powder.

In addition to $SiO_2$ as a main material, a compound such as $GeO_2$, $P_2O_5$, $TiO_2$, or $Al_2O_3$ is added as an additive for controlling (increasing) a refractive index to the plastic material 71 as needed. On the other hand, a compound such as $B_2O_3$ or F is added as an additive for controlling (decreasing) a refractive index to the plastic material 73 in addition to $SiO_2$ as a main material.

These compounds are mixed in the form of a powder or added as a solution such as an acetate, nitrate, or alkoxide. Alternatively, a silica powder containing the compound may be synthesized by a CVD method.

The plastic materials 71 and 73 can be prepared following entirely the same procedures as for the plastic materials in the first aspect.

Note that as in the first embodiment, the inlet port for supplying the plastic material 73 as the cladding material may be formed at a plurality of positions.

An operation of this embodiment of the present invention will be described below.

The plastic material 7 is supplied from the hopper 43 into the primary kneading chamber 44, and the plastic material 73 is supplied from the hopper 53 into the primary kneading chamber 54. The motors 42 and 52 are driven to supply the plastic materials 71 and 73 at predetermined rates.

When the forming apparatus is operated in this manner, as shown in FIG. 5, the plastic material 71 in the primary kneading chamber 44 is supplied from the inlet port 62 of the cross head 61 into the passage 65 through the vacuum chamber 45 and the secondary kneading chamber 46, and the plastic material 73 in the primary kneading chamber 54 is supplied from the inlet port 6 of the cross head 61 into the passage 66 through the vacuum chamber 55 and the secondary kneading chamber 56.

The plastic materials 71 and 73 join each other at the joint portion 67 of the cross head 61 to form a shaped body 75 having a porous glass body 72 as a core at its center and a porous glass body 74 as cladding at its outer periphery. The shaped body 75 is extruded from the outlet port (die portion) 64.

Thereafter, the shaped body 75 is dried by a dryer to remove its water and subjected to decreasing (binder removal) in a decreasing furnace.

Subsequently, purifying treatments and then a consolidating treatment are performed in accordance with conventional methods, thereby obtaining a perform.

The third embodiment of the present invention will be described below.

In each of the above first and second aspects, the inlet port of a core material and that of a cladding material are arranged perpendicular to each other. In the third aspect, however, these inlet ports are formed such that an angle defined by the axes of the inlet ports is less than 90°.

When the inlet ports are arranged in this manner, a cladding material can be flowed more uniformly to decrease a strain or a density inhomogeneity in a shaped body.

Figure 6:
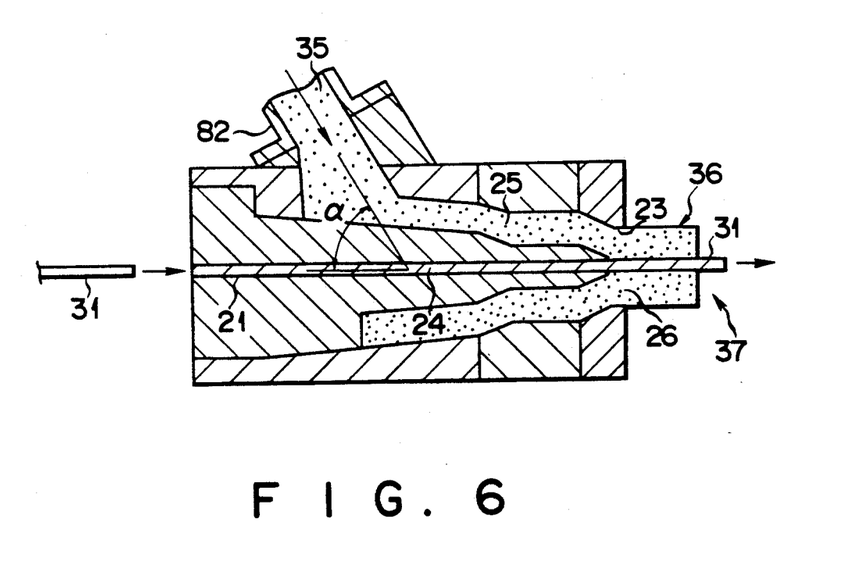
FIGS. 6 and 7 are sectional views showing cross heads of apparatuses used to practice the third embodiment of the present invention.
Figure 7:
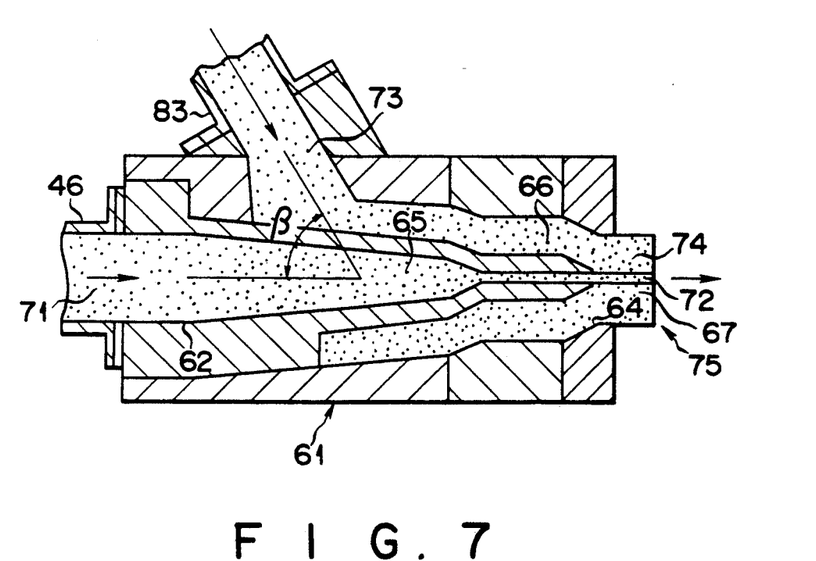

FIGS. 6 and 7 are sectional views showing cross heads of apparatuses for practicing this aspect, and correspond to FIGS. 2 and 5, respectively. In FIG. 6, an inlet port 82 is formed in place of the inlet port 22 shown in FIG. 2. In FIG. 7, an inlet port 83 is formed in place of the inlet port 63. An angle $\alpha$ defined by the axes of an inlet port 21 and the inlet port 82 shown in FIG. 6 and an angle $\beta$ defined by the axes of an inlet port 62 and the inlet port 83 shown in FIG. 7 are set to be less than 90°.

In this aspect, an optical waveguide perform can be manufactured by using the apparatuses shown in FIGS. 6 and 7 following the same procedures as in the first and second embodiments.

The fourth embodiment of the present invention will be described below. In this aspect, the diameter of an outlet port is rendered variable to enable fine adjustment of the outer diameter of a shaped body. As a result, even when an outer diameter of a core rod is little changed from designed value, in manufacturing the perform, an outer diameter can be adjusted without replacement of a die at the outlet port.

Figure 8:
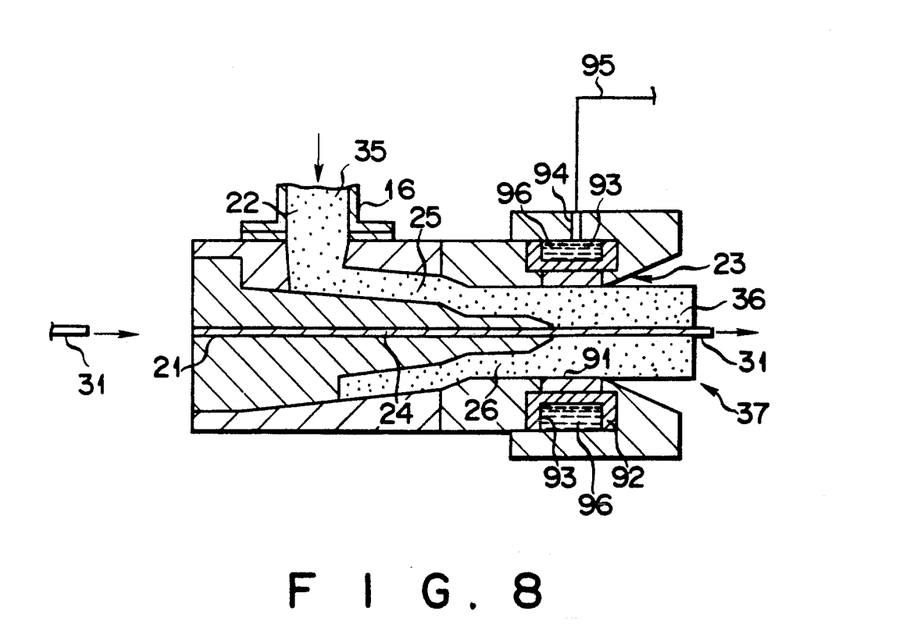
FIG. 8 is a sectional view showing a cross head of an apparatus used to practice the fourth embodiment of the present invention.

FIG. 8 is a sectional view showing a cross head of an apparatus for practicing the aspect. Since the basic arrangement of this cross head is similar to that of the cross head shown in FIG. 2, a description of the same parts as in FIG. 2 will be omitted.

In this cross head, a ring-like die 91 having expandability is arranged in the inner circumferential surface of a outlet port 23 to adjust the diameter of the outlet port 23.

The die 91 consists of an elastic material such as rubber or a synthetic resin.

The die 91 is assembled to the outlet port 23 such that its inner circumferential surface is leveled with the inner circumferential surface of the outlet port 23.

A pressure vessel 92 for contracting and expanding the die 91 in the radial direction is arranged on the outer circumferential surface of the die 91.

The pressure vessel 92 is constituted by a ring having a space portion 93 in its outer peripheral portion. The space portion 93 has a U-shaped sectional shape.

The pressure vessel 92 is sealed and buried in a thick-wall portion of the outlet port 23 so as to be in contact with the outer circumferential surface of the die 91. A through hole 94 is formed in the outer circumferential surface of the outlet port 23 to communicate with the space portion 93 of the pressure vessel 92.

A pipe system 95 having, e.g., a fluid tank, a pump, and a valve (none of which are shown) is connected to the through hole 94 to communicate with the space portion 93 of the pressure vessel 92. Referring to FIG. 8, the pipe system 95 has both functions of charging and discharging a fluid.

A fluid 96 to be supplied from the pipe system 95 into the space portion 93 of the pressure vessel 92 may be either a liquid or a gas, and a proper one is selected from the two. However, the fluid 96 is preferably water because water has a small compression ratio and is economical and easy to handle.

As the pressure vessel 92, a hollow loop band in which the upper surface of the space portion 93 is closed may be adopted.

In this structure, since the hollow portion of the band serves as the space portion 93, a connection hole for connecting the pipe system 95 is formed in the outer peripheral portion of the band (pressure vessel 92).

The pressure vessel 92 may be formed without using the ring having the space portion 93 or the hollow band. That is, a portion of the outlet port 32 having a fitting space for fitting and holding a ring or a belt is directly used as the pressure vessel 92.

In this structure, the fitting space of the outlet port 23 is air-tightly sealed except for the through hole 94.

Also in this embodiment, an optical waveguide perform can be manufactured following the same procedures as in the first embodiment.

EXAMPLE 1

This example corresponds to the first embodiment of the present invention

As the silica glass rod 31, a glass rod having core glass 32 formed of $SiO_2$-$GeO_2$ and a part of cladding glass 33 formed of pure $SiO_2$ was used.

This glass rod 31 was formed by a VAD method. The outer diameter ratio of core glass 32 : cladding glass 33 was 1:3%, and the difference of the specific refractine index Δ between core glass 32 and cladding glass 33 was 0.3%. The diameter of the glass rod was 8 mm, and its length was 600 mm.

An attached rod 34 consisting of silica glass and having a diameter of 8 mm and a length of 300 mm was glass-welded as a support to one end of the glass rod 31.

The plastic material 35 was obtained by adding methylcellulose as a binder to a silica ($SiO_2$) powder having an average grain size of 8 μm, mixing the two materials, and kneading the resultant mixture with pure water. The mixing ratio of the silica powder : methylcellulose : pure water was 100 : 3 : 22.

The apparatus was operated following the same procedures as described above.

The glass rod 31 was supplied from the inlet port 21 of the cross head 20 into the passage 24 by the glass rod supply machine, and the plastic material 35 in the primary kneading chamber 14 was supplied from the vacuum chamber 15 and the secondary kneading chamber 16 into the passage 25 through the inlet port 22 of the cross head 20 at an extrusion rate of 30 kg/h.

The glass rod 31 and the plastic material 35 joined each other at the joint portion 26 and were integrally extruded from the outlet port 23 of the cross head 20. As a result, a shaped body 37 in which the porous glass body 36 consisting of the plastic material was formed on the surface of the glass rod 31 was obtained.

A time required for the above extrusion was 15 minutes.

After the plastic material 35 was formed on the surfaces of the glass rod 31 and the attached rod 34, only the glass powder porous body 36 deposited on the surface of the attached rod 34 was removed, and the glass powder porous' body 36 on the surface of the glass rod 31 was dried in a dryer at 110° C. Thereafter, decreasing was performed at 500° C. for four hours.

The degreased glass powder porous body 36 had an outer diameter of about 50 mm and a relative density of about 60%.

Subsequently, the degreased glass powder porous body 36 was subjected to purifying treatments (in an He/$Cl_2$ atmosphere at 1,200° C.) and a consolidating treatment (in an He atmosphere at 1,600° C.) in accordance with conventional methods, thereby obtaining an optical fiber perform.

Thereafter, the above perform was subjected to drawing in order to form a single-mode optical fiber having an outer diameter of 125 μm, and a coating made of an ultraviolet-curing resin and having an outer diameter of 400 μm was formed on the outer circumferential surface of the optical fiber immediately after the drawing.

The obtained coated optical fiber had transmission characteristics equivalent to those of an optical fiber obtained mainly by a conventional all-synthesis VAD method.

EXAMPLE 2

This example corresponds to the second embodiment of the present invention.

The plastic material 71 was obtained by adding a 10% aqueous PVA solution to a silica powder (containing 3.5 wt% of $GeO_2$ as a dopant for increasing a refractive index) synthesized by flame hydrolysis and having an average particle size of 0.7 μm at a ratio of powder : solution of 100 : 36, and uniformly kneading the two materials.

The plastic material 73 was obtained by adding methylcellulose as a binder and pure water to a silica powder having an average particle size of 8 μm at a ratio of powder : methylcellulose : pure water of 100 : 3 : 22, and uniformly kneading the these materials.

As the extrusion-forming apparatus, an apparatus in which the passage 65 had a distal end diameter of 4 mm and the joint portion 67 had a distal end diameter of 50 mm was used.

The plastic material 71 was supplied from the hopper 43 into the primary kneading chamber 44, and the plastic material 73 was supplied from the hopper 53 into the primary kneading chamber 54. The motors 42 and 52 were driven to maintain an extrusion rate of the plastic material 71 at 0.2 kg/h and that of the plastic material 73 at 40 kg/h. The plastic material 71 in the primary kneading chamber 44 was supplied from the inlet port 62 of the cross head 61 into the passage 65 through the vacuum chamber 45 and the secondary kneading chamber 46, and the plastic material 73 in the primary kneading chamber 54 was supplied from the inlet port 63 into the passage 66 through the vacuum chamber 55 and the secondary kneading chamber 56.

These plastic materials 71 and 73 joined each other at the joint portion 67 of the cross head 61 to form the shaped body 75 having the porous glass body 72 as a core at its center and the porous glass body 74 as a cladding at its outer periphery. The shaped body 75 was extruded from the outlet port (die portion) 64 of the cross head 61.

A time required for the above extrusion was 15 minutes.

The molded body 75 was dried in a dryer at 110° C. and degreased at 500° C. for four hours.

The shaped body 75 subjected to these treatments had an outer diameter of about 48 mm and a relative density of about 57%.

After being dried and degreased, the molded body 75 was purified and consolidated to form an optical fiber perform.

The dehydrating and purifying treatments were performed in an He/Cl$_2$ atmosphere at 1,200° C., and the consolidating treatment was performed in an He atmosphere at 1,600° C., in accordance with conventional methods.

Thereafter, the above perform was subjected to drawing by a known method to form a single mode optical fiber having an outer diameter of 125 μm, and a coating consisting of an ultraviolet-curing resin and having an outer diameter of 400 μm was formed on the outer circumferential surface of the optical fiber immediately after the drawing.

The coated optical fiber of Example 2 had transmission characteristics equivalent to those of an optical fiber obtained mainly by a conventional all-synthesis VAD method.

EXAMPLE 3

This example corresponds to the third embodiment of the present invention.

An apparatus in which the angle α defined by the axes of the inlet ports 21 and 82 shown in FIG. 6 wa set at 60° was prepared.

Such an apparatus was used to manufacture a shaped body following the same procedures as in Example 1. This shaped body had a strain and a density inhomogeneity smaller than those of the shaped body of Example 1.

The shaped body was subjected to the treatments following the same procedures as in Example 1 to form an optical fiber perform having the same shape as that of Example 1. In addition, a coated optical fiber was manufactured following the same procedures as in Example 1.

The coated optical fiber had transmission characteristics equivalent to those of an optical fiber obtained mainly by a conventional all-synthesis VAD method.

On the other hand, an apparatus in which the angle β defined by the axes o the inlet ports 62 and 83 shown in FIG. 7 was set at 60° was prepared.

Such an apparatus was used to manufacture a shaped body following the same procedures as in Example 2. This shaped body had a strain and a density inhomogeneity smaller than those of the shaped body of Example 2.

The shaped body was subjected to the treatments following the same procedures as in Example 2 to form an optical fiber perform having the same shape as that of Example 2. In addition, a coated optical fiber was manufactured following the same procedures as in Example 2.

The coated optical fiber had transmission characteristics equivalent to those of a optical fiber obtained mainly by a conventional all-synthesis VAD method.

EXAMPLE 4

This example corresponds to the fourth aspect of the present invention.

In FIG. 8 the distal end diameter of the joint portion 67 was 55 mm, and the inner diameter of the die 91 was 55 mm. In this state, water (fluid 96) as a pressure medium was charged from the pipe system 95 into the pressure vessel 92 to expand the vessel 92. As a result, the die 91 was contracted in the radial direction to decrease and the diameter of the die became 50 mm. In this arrangement, the state in which extrusion following the same proceduses as in Example 1 was able to perform can be obtained by using a glass rod and plastic material similar to Example 1.

The outer diameter of a core rod which was designed 8 mm became 7.8 mm (the outer diameter ratio of cladding : core = 1 : 2.9), due to uniformity of etching by HF. In order to perform extrusion similar to Example 1 using the core rod, it require that water (fluid 96) as a pressure medium is exhausted from the pressure vessel 92 to adjust the inner diameter of the die 91 to 52 mm. Adjusting the inner diameter of the die 91 described above, extrusion was performed. As a result, a shaped body having an outer diameter of 52 mm and a length of 600 mm was obtained.

This shaped body was subjected to the treatments following the same procedures as in Example 1 to form a perform, and the perform was subjected to the treatments following the same procedures as in Example 1 to manufacture an optical fiber. As a result, a single-mode optical fire equivalent to that of Example having desired shape 1 was obtained.

Note that a single-mode optical fiber is exemplified in each of the above examples, but an optical fiber is not limited to this type. In addition, the present invention is not limited to an optical fiber perform but can be applied to other optical waveguides such as an image fiber, and a light guide.

Additional advantages and modifications will readily occur to those skilled in the art. Therefore, the invention i its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A method of manufacturing a silica glass optical waveguide perform comprising the steps of:

providing an extruding apparatus which has at least two independent inlet ports, one outlet port communicating with said inlet ports, and at least two passages connecting said inlet ports with said outlet port, and an which said at least two passages meet at a joint portion of said passages, a section of said joint portion having a central passage portion and an outer peripheral passage portion which is concentrically arranged around said central passage portion;

supplying a porous-shaped glass-containing optical fiber body as a core material to one of said passages communicating with the central portion of said joint portion from a corresponding inlet port, and supplying a cladding material to the other passage communicating with the outer peripheral passage portion from a corresponding other inlet port, thereby causing the core and cladding materials to join with each other at said joint portion with said cladding material being around said core material;

extruding an integral shaped body from said outlet port, said body having a central portion corresponding to a core material at a central portion thereof and a cladding portion corresponding to a cladding material around the central portion;

drying said shaped body;

removing impurities from said shaped body to form a resultant body; and thereafter consolidating said resultant body.

2. The method according to claim 1, comprising forming said passage extending from said inlet port for supplying the core material as a straight passage.

3. The method according to claim 2;, wherein the core material is a glass rod containing silica glass, and the cladding material is a material having plasticity and containing a silica glass powder.

4. The method according to claim 3, wherein said glass rod is obtained by a CVD method.

5. The method according to claim 3, wherein said glass rod has a portion of a cladding material formed on an outer circumferential surface thereof.

6. The method according to claim 2, wherein both the core material and the cladding material are formed of a material having plasticity and containing silica glass powder.

7. The method according to claim 1, wherein an angle defined by axes of said inlet port for supplying the core material and said inlet port for supplying the cladding material is less than 90°.

8. The method according to claim 1, comprising forming said outlet port of said extruding apparatus with a variable diameter die opening.

9. The method according to claim 8, wherein a contractible and expandable ring-like die member is provided on an inner circumferential surface of said outlet port, and a pressure vessel for contracting and expanding said die member in a radial direction is provided on an outer circumferential surface of said die member, for thereby varying the diameter of said outlet port in accordance with contraction and expansion of said die member.

10. The method according to claim 1, wherein said removing step comprises the steps of removing a binder from said shaped body, and purifying said shaped body.

* * * * *